(12) United States Patent
Robertson et al.

(10) Patent No.: US 12,266,069 B1
(45) Date of Patent: Apr. 1, 2025

(54) ENVIRONMENT ADAPTIVE CONTENT (71) Applicant: Apple Inc., Cupertino, CA (US)

(72) Inventors: Andrew S. Robertson, Los Angeles, CA (US); David Hobbins, Venice, CA (US); James R. Cooper, Los Angeles, CA (US); Joon Hyung Ahn, Culver City, CA (US)

(73) Assignee: Apple Inc., Cupertino, CA (US)

( * ) Notice: Subject to any disclaimer, the term of this patent is extended or adjusted under 35 U.S.C. 154(b) by 147 days.

(21) Appl. No.: 17/887,653

(22) Filed: Aug. 15, 2022

Related U.S. Application Data

(60) Provisional application No. 63/238,823, filed on Aug. 31, 2021.

(51) Int. Cl.
*G06T 19/20* (2011.01)
*G06T 19/00* (2011.01)

(52) U.S. Cl.
CPC ............ *G06T 19/20* (2013.01); *G06T 19/006* (2013.01); *G06T 2219/2004* (2013.01); *G06T 2219/2016* (2013.01)

(58) Field of Classification Search
CPC ............... G06T 19/20; G06T 19/006; G06T 2219/2004; G06T 2219/2016
USPC ........................................................ 345/419
See application file for complete search history.

(56) References Cited

U.S. PATENT DOCUMENTS

2017/0162177 A1\* 6/2017 Lebeck ............... G06F 21/6218
2020/0271450 A1\* 8/2020 Gorur Sheshagiri ... G06F 1/163

\* cited by examiner

*Primary Examiner* — Thomas J Lett
(74) *Attorney, Agent, or Firm* — Thompson Hine LLP (57) ABSTRACT

Various implementations disclosed herein include devices, systems, and methods that provide extended reality (XR) environments that include virtual content anchored to objects within physical environments. Such objects may be movable objects. In some implementations, the virtual content is adaptive in that the virtual content is presented based on a characteristic of the movable object. For example, a virtual game piece may be scaled, shaped, etc. to match a physical game piece to which it is anchored. As another example, a virtual gameboard may be scaled and positioned on a real table such that the edge of the gameboard aligns with the edge of the table and such that a virtual waterfall appears to flow over the edge of the real table.

24 Claims, 7 Drawing Sheets

```
┌─────────────────────────────────────────┐
│    Obtain sensor data from a sensor     │── 502
│        in a physical environment        │
└─────────────────────────────────────────┘
                    │
                    ▼
┌─────────────────────────────────────────────┐
│ Determine to anchor virtual content to the  │
│ element, wherein, based on anchoring the    │── 504
│ virtual content to the element, the virtual │
│ content is moved based on movement of the   │
│ element                                     │
└─────────────────────────────────────────────┘
                    │
                    ▼
┌─────────────────────────────────────────────┐
│ Present an XR environment comprising a view │
│ of at least a portion of the physical       │
│ environment and the virtual content, where  │── 506
│ the virtual content replaces or enhances    │
│ the element to which it is anchored and is  │
│ adapted based on the characteristic of the  │
│ element                                     │
└─────────────────────────────────────────────┘
```

ENVIRONMENT ADAPTIVE CONTENT

CROSS-REFERENCE TO RELATED APPLICATIONS

This application claims the benefit of U.S. Provisional Application Ser. No. 63/238,823 filed Aug. 31, 2021, which is incorporated herein in its entirety.

TECHNICAL FIELD

The present disclosure generally relates to electronic devices that use sensors to provide views of 3D environments, including views that include representations of objects of physical environments and/or virtual content.

BACKGROUND

Existing extended reality (XR) systems may be improved with respect to providing more realistic, immersive, multi-sensory, comfortable, and/or adaptive content and environments.

SUMMARY

Various implementations disclosed herein include devices, systems, and methods that provide extended reality (XR) environments that include virtual content anchored to objects within physical environments. Such physical environment objects may be movable objects, meaning that the objects may be non-structural/non-fixed portions of the physical environments. Examples of movable objects include hand-held objects, toys, clothing, books, papers, furniture, and wall hangings. In contrast, examples of non-movable objects include walls, floors, and ceilings. In some implementations, the virtual content is adaptive in that the virtual content is presented based on a characteristic of the movable object. For example, a virtual game piece may be scaled, shaped, etc. to match a physical game piece to which it is anchored. As another example, a virtual gameboard may be scaled and positioned on a real table such that the edge of the gameboard aligns with the edge of the table and such that a virtual waterfall flows over the edge of the real table.

In some implementations, a processor performs a method by executing instructions stored on a computer readable medium. The method obtains sensor data from a sensor in a physical environment and determines a characteristic (e.g., position, size, type of object) of a movable object (e.g., a game piece, table) of the physical environment based on the sensor data. In some implementations, this involves a computer vision-based scene recognition process that recognizes and/or categorizes objects within a physical environment.

The method determines to anchor virtual content to the movable object such that the virtual content is moved based on movement of the movable object. For example, a virtual game piece may be anchored to real world game piece so that movement of the real-world game piece provides a corresponding movement of the virtual game piece. In this example, the view of the XR environment may present the virtual game piece in place of the real-world game piece. In another example, a virtual game board is anchored to a real-world table and moves if the table is moved. Some implementations determine where and to what to anchor virtual content based on the characteristic, e.g., determining to anchor the virtual game board to a table because the table has a flat horizontal surface that is sufficiently free of clutter and that has sufficient size dimensions and/or because the object's object type is "table." In some implementations, an anchoring determination is based on user input, e.g., a user selecting which of several tables to play a virtual game on.

An anchoring determination may be based on assessing a physical environment, for example, by performing a scene understanding analysis based on images and/or other sensor data. For example, such an analysis may identify the types of objects in the physical environment, characteristics of the objects (e.g., sizes, shapes, heights, flatness, levelness, having edges, the distances of sides and edges from nearby floors, walls, other objects, etc.), and/or states of the objects (e.g., cluttered, free of clutter, etc.). The anchoring may be based on understanding based on the objects and other factors (e.g., the direction of gravity with respect to the object's edges and nearby floors, etc.). For example, based on understanding gravity with respect to a table's edge and the floor below, a waterfall may be anchored on the table and appear to flow over the table's edge to the floor below. A game space/game board with such a waterfall in it may be generally positioned with respect to the physical environment so that the waterfall may be positioned accordingly. In other examples, a game space/game board includes multiple elements (e.g., waterfalls, mountains, tunnels, etc.) that are used in positioning the game space as a whole such that the individual elements can be anchored to appropriate features of a physical environment.

The method presents an extended reality (XR) environment comprising a view of at least a portion of the physical environment (e.g., pass through video or a view through a transparent/translucent display) and the virtual content, where the virtual content replaces or enhances the movable object to which it is anchored and is adapted based on the characteristic of the movable object. For example, the virtual content may be adapted by being scaled or reshaped to match some or all of the game piece or to match the table. The virtual content may be positioned based on size, boundaries, etc. of the physical object. In one example, a virtual waterfall in the virtual content may be positioned to flow over the edge of the table.

In some implementations, interaction with (e.g., movement of) the object is interpreted as input, e.g., to move the anchored virtual game piece or provide input related to other virtual content. The anchored and adapted virtual content may provide a desirable tactile experience for a user interacting with a virtual game or any other type of virtual content.

Various other implementations disclosed herein include devices, systems, and methods that provide a view of a physical environment that transitions to a view of an XR environment in which one or more objects of the physical environment are removed or replaced. Certain objects (e.g., a couch identified by a user) may remain visible while the floor and/or other objects of the physical environment are removed or replaced with virtual content. In some implementations, a processor performs a method by executing instructions stored on a computer readable medium. The method obtains sensor data from a sensor in a physical environment and presents a first view depicting a first object and a second object of the physical environment, where the first view is provided using a first viewing mode. In one example, some or all of the content presented in the first viewing mode may be pass-through video of all (or most) of the real objects of the physical environment. The method identifies the first object of the physical environment to persist during a change from the first viewing mode to a second viewing mode. The first object may be identified based on received input, e.g., a user selecting his or her couch to remain visible during the change. In response to changing the first viewing mode to the second viewing mode, the method presents a second view depicting the first object, where the second object is removed or replaced in the second view. In some examples, objects that are not identified to persist in the second mode vanish or are replaced with virtual content.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1:
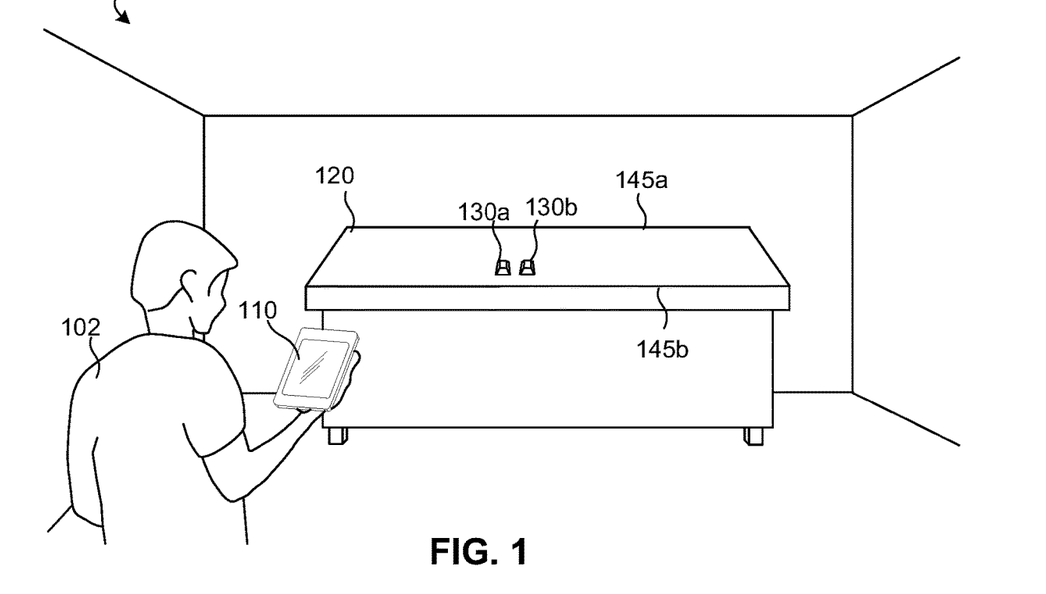
FIG. 1 illustrates exemplary an electronic device operating in a physical environment in accordance with some implementations.

FIG. 1 illustrates an exemplary electronic device 110 operating in a physical environment 100. In this example of FIG. 1, the physical environment 100 is a room that includes a table 120 and two hand-held objects 130a-b. The electronic device 110 includes one or more cameras, microphones, depth sensors, or other sensors that can be used to capture information about and evaluate the physical environment 100 and the objects within it, as well as information about the user 102 of the electronic device 110.

The information about the physical environment 100 and/or user 102 may be used to provide visual and audio content. For example, views of an extended reality (XR) environment may be provided to one or more participants (e.g., user 102 and/or other participants not shown). Such a XR environment may include views of a 3D environment that is generated based on camera images and/or depth camera images of the physical environment 100 as well as a representation of user 102 based on camera images and/or depth camera images of the user 102. Such an XR environment may include virtual content.

Figure 2:
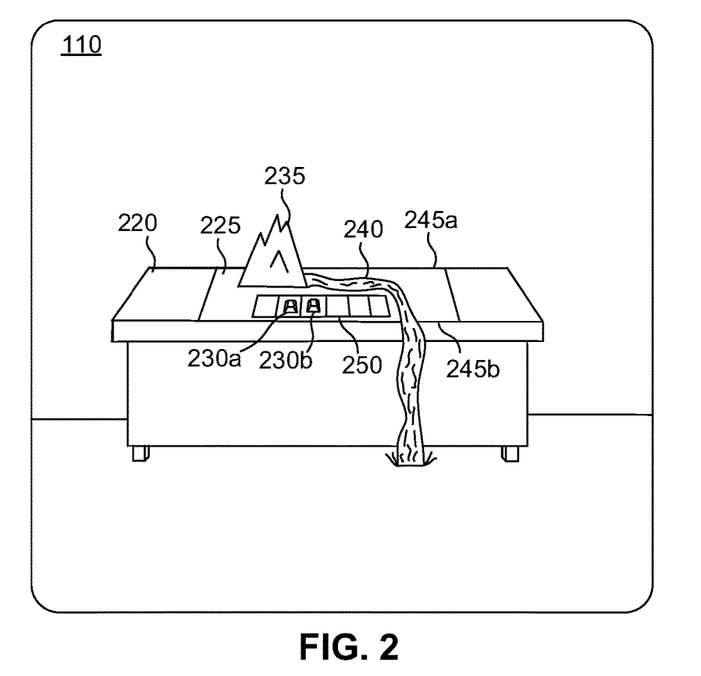
FIG. 2 illustrates a view of an extended reality (XR) environment provided by the device of FIG. 1 based on the physical environment and virtual content in accordance with some implementations.

FIG. 2 illustrates a view 110 of an XR environment provided by the device of FIG. 1 based on the physical environment and virtual content in accordance with some implementations. In this example, the view on device 110 includes a depiction 220 of the table 120. The view on the device 110 also includes virtual content that includes a virtual game board 225 that is anchored to the table 120. The virtual game board includes a mountain 235, a waterfall 240, and game piece spaces 250. The virtual game board 225 is adapted to the object to which it is anchored, e.g., it is sized and positioned to fit on the table 120. In this example, the virtual gameboard 225 is sized and positioned such that a first edge of the gameboard 245a aligns with a first edge 145a of the table 120 and a second edge of the gameboard 245b aligns with a second edge 145b of the table 120. The virtual game board 225 thus appears to fit in a desired way on the available playing surface on the depiction 220 of the table 120. Moreover, in this example, a 3D feature of the gameboard is adapted to the physical environment 100 and specifically adapted to the object to which the virtual game board is anchored. The waterfall is adapted to flow over edge 245b (corresponding to the edge 145b of the table 120) and flow down and splash off of the floor (e.g., the depiction of the floor of the physical environment provided in the XR environment).

The virtual content also includes virtual game pieces 230a and 230b which are anchored to the two hand-held objects 130a-b of the physical environment 100. In this example, the virtual game pieces 230a and 230b are adapted by being sized, shaped, and positioned based on the two hand-held objects 130a-b of the physical environment 100. In some implementations, the virtual game pieces 230a and 230b have one or more different characteristics than the two hand-held objects 130a-b of the physical environment 100. For example, the virtual game pieces 230a and 230b may have different colors, markings, size, shape, etc. In one example, each virtual game piece includes a first portion that corresponds to the size and shape of the object to which it is anchored and a second portion comprising additional virtual content (e.g., a static or animated 3D shape). The anchored virtual objects may provide an easy, realistic, and otherwise desirable tactile and/or interactive experience. For example, a user may pick up hand-held objects 130a-b while viewing anchored virtual objects and experience a realistic sensation of as if the user were touching and picking up the virtual objects.

In some implementations, device 110 determines how to present a virtual object such as virtual game board by (a) selecting a physical object to anchor a virtual object to based on criteria (e.g., whether the object has particular characteristics, e.g., is sufficiently flat, whether the object satisfies minimum size/dimensional characteristics, whether the object is positioned nearby another element, e.g., having an edge above a floor, whether there is sufficient space around the object, whether other objects are better suited with respect to the requirements, user preferences, etc.), (b) adapting the virtual object based on characteristics of the physical object (e.g., size, dimensions, orientation, height, etc.) and adaption criteria for the virtual object (e.g., size, shape, edge matching, orientation, height, or other adaptations), and/or tracking movement/position/orientation of the physical object so that the virtual object can be moved, changed, or further adapted accordingly. In some implementations, determining how to present a virtual object depends upon what is in the physical environment. For example, if there is a battery in the physical environment, a virtual power source may be presented in a manner that matches the size and shape of the battery. As another example, if there is glass containing water in the physical environment, a virtual watering hole may be anchored to the glass and virtual animals may be altered to behave differently, e.g., to be excited when they encounter the virtual watering hole. In generally, the virtual content may be presented in a way based on the physical environment that enhances the sense of connection between the physical environment and the virtual content.

Figure 3:
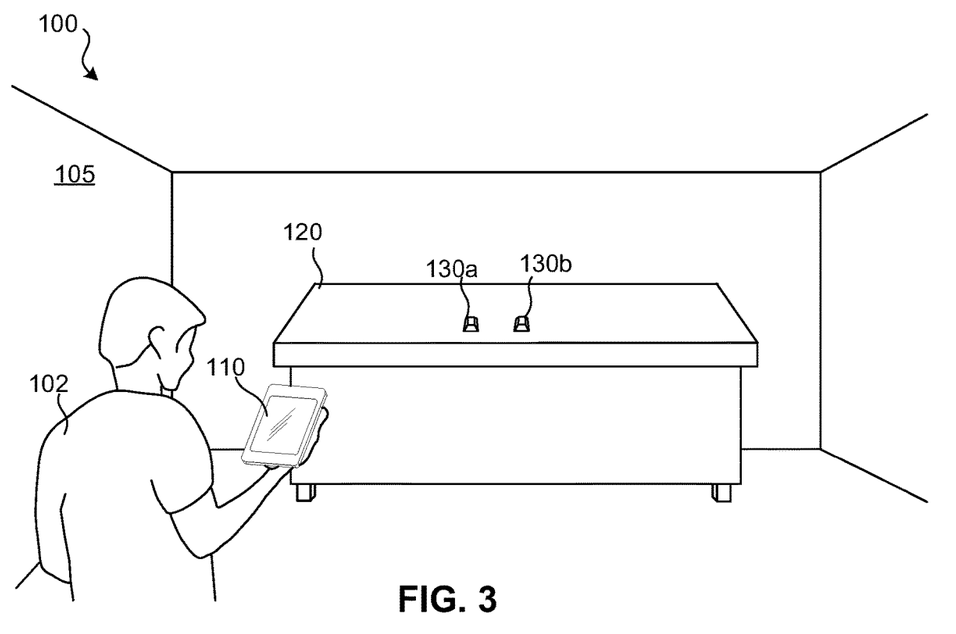
FIG. 3 illustrates movement of movable objects of the physical environment of FIG. 1 in accordance with some implementations.
Figure 4:
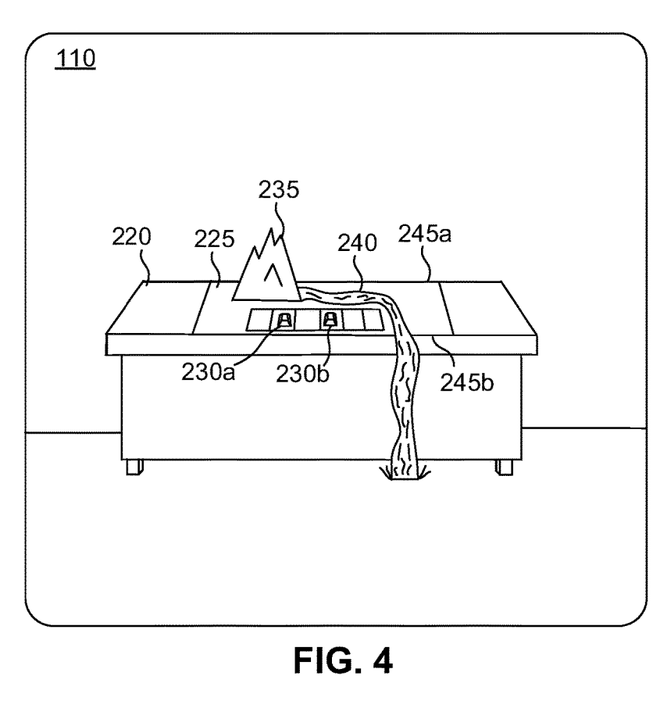
FIG. 4 illustrates a changed view of the XR environment provided by the device of FIG. 1 in accordance with some implementations.

FIGS. 3 and 4 illustrate how a movement of hand-held object 130b in the physical environment 100 results in a corresponding movement of the anchored virtual object 230b in the view of the XR environment. Specifically, hand-held object 130b has been repositioned (e.g., by user 102) in the physical environment 100 and the anchored virtual object 230 moves accordingly. Such a movement may be intentionally (or unintentionally) performed by user 102 while viewing the XR environment, e.g., the user may be viewing the XR environment as shown in FIGS. 2 and 4 while moving the hand-held object 130b and watching the corresponding movement of the virtual object 230b. The real tactile sensation of touching object 130b in the physical environment while viewing a corresponding movement of the anchored virtual object 230b may provide a realistic, immersive, or otherwise desirable user experience.

Movement of objects in the physical environment, such as table 120 and hand-held objects 130a-b may be tracked by one or more sensors on the device 110. For example, images and sensor data from cameras, depth sensors, and other sensors may be monitored to identify objects in the physical environment 100 and their movements over time. In some implementations, an algorithm or machine learning model is configured to receive a time-based stream of sensor data from one or more sensors and update object positioning/orientation data over time. In some implementations, a semantically labelled 3D model (e.g., mesh, point cloud, etc.) of the physical environment 100 is generated and updated over time based on an incoming stream of live sensor data. Based on the tracked physical object movements, any anchored virtual content can be moved accordingly.

Figure 5:
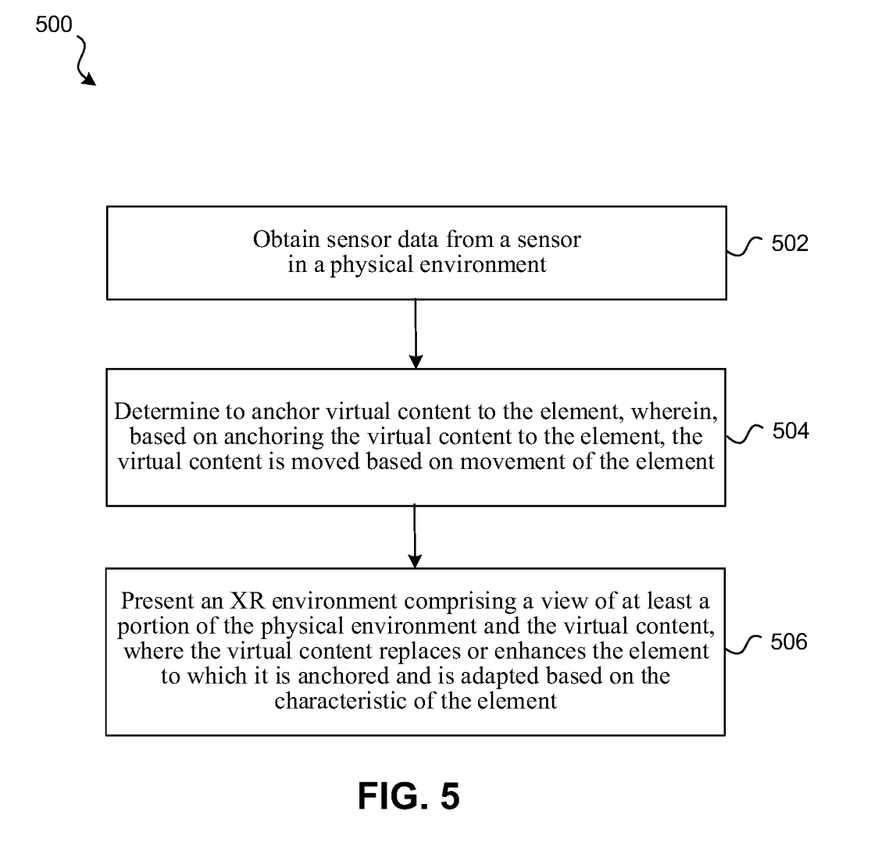
FIG. 5 is a flowchart illustrating a method for providing an XR environment that includes virtual content anchored to a movable object within a physical environment in accordance with some implementations.

FIG. 5 is a flowchart illustrating a method 500 for providing an XR environment that includes virtual content anchored to a movable object within a physical environment. In some implementations, a device such as electronic device 110 performs method 500. In some implementations, method 500 is performed on a mobile device, desktop, laptop, HMD, ear-mounted device or server device. The method 500 is performed by processing logic, including hardware, firmware, software, or a combination thereof. In some implementations, the method 500 is performed on a processor executing code stored in a non-transitory computer-readable medium (e.g., a memory).

At block 502, the method 500 obtains sensor data from a sensor in a physical environment. For example, one or more images from one or more cameras on an electronic device may be captured. Sensor data may be obtained while a view of the physical environment is provided, e.g., via pass-through video or passively seen through a transparent/translucent display. The method 500 may determine a characteristic (e.g., position, size, type of object, etc.) of a movable object (e.g., a game piece, table, cup, etc.) of the physical environment based on the sensor data. This may involve one or more algorithms and/or machine learning models configured to identify objects, semantically-label objects, and/or determine characteristics of objects based on sensor data.

At block 504, the method 500 determines to anchor virtual content to the movable object. Once anchored, the virtual content is moved based on movement of the object. For example, based on anchoring the virtual content to the movable object, the virtual content is moved based on movement of the movable object. For example, a virtual game piece may be anchored to real world game piece, a gameboard may be anchored to a table top, etc. Where and to what to anchor virtual content may be based on one or more characteristics of a physical object. For example, method 500 may determine to anchor the virtual content to a table based on determining that the table has a flat horizontal top surface having sufficient size dimensions and/or based on determining that the object's object type is "table". The anchor determination may also be based on user input, e.g., a user selecting which table to play on.

At block 506, the method presents (e.g., displays) an extended reality (XR) environment comprising a view of at least a portion of the physical environment and the virtual content, where the virtual content replaces or enhances the movable object to which it is anchored and is adapted based on the characteristic of the movable object. For example, the virtual content may be adapted by being scaled or reshaped to fit the game piece or table and/or positioned based on size, boundaries, etc. Virtual content may be adapted based on the characteristic of the movable object by positioning the virtual content such that an edge effect of the virtual content corresponds to an edge of the movable object. In one example, virtual content includes a gameboard and a waterfall (as illustrated in FIG. 4) that are adapted such that the waterfall will flow over the edge of the table upon which the game board is presented.

In some implementations, interaction with the object such as touches and movements are interpreted as input, e.g., to move the anchored virtual game piece or provide input related to other virtual content. In some implementations, the anchored and adapted virtual content may provide a desirable tactile experience for a user interacting with a virtual game or other virtual content.

In some implementations, animated or otherwise time-varying virtual content is anchored to a static object in a physical environment. Such anchoring enables a variety of novel and unique user experiences, for example, enabling a user to reposition a set of animated objects by moving around corresponding physical objects. For example, a user may push and release a game piece to cause the game piece to slide across the surface of a table in a physical environment and view a corresponding (anchored) virtual horse galloping (via animation) as the physical game piece slides.

Figure 6:
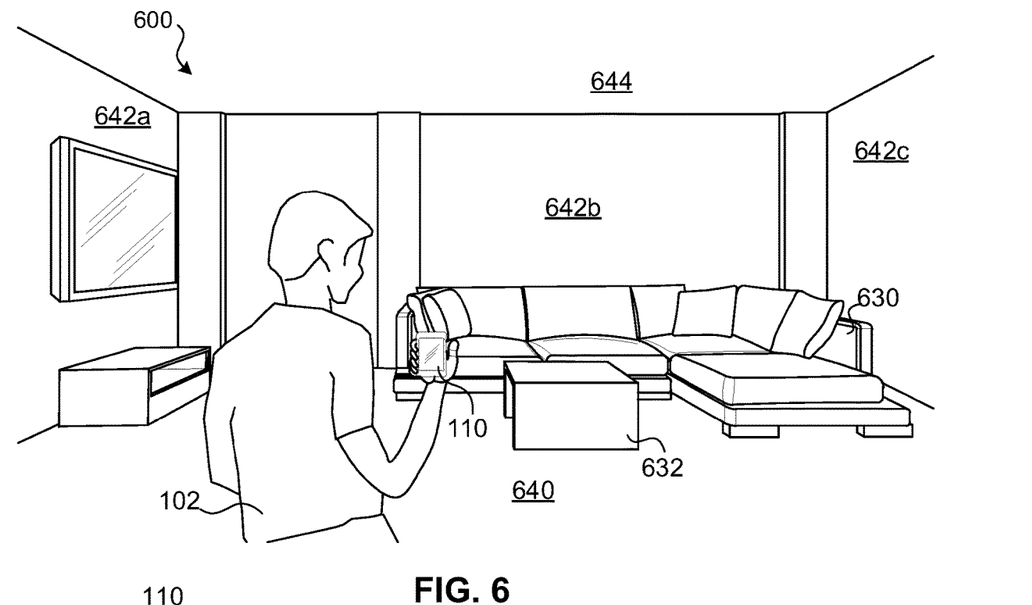
FIG. 6 illustrates exemplary an electronic device operating in a physical environment in accordance with some implementations.

FIG. 6 illustrates exemplary electronic device 110 operating in a physical environment 600. In this example of FIG. 6, the physical environment 600 is a room that includes a floor 640, walls 642a-c, a ceiling 644, a sofa 630 and a table 632. The electronic device 110 includes one or more cameras, microphones, depth sensors, or other sensors that can be used to capture information about and evaluate the physical environment 600 and the objects within it, as well as information about the user 102 of the electronic device 110. The information about the physical environment 600 and/or user 102 may be used to provide visual and audio content. For example, views of an extended reality (XR) environment may be provided to one or more participants (e.g., user 102 and/or other participants not shown). Such an XR environment may include views of a 3D environment that is generated based on camera images and/or depth camera images of the physical environment 100 as well as a representation of user 102 based on camera images and/or depth camera images of the user 102. Such an XR environment may include virtual content.

Figure 7:
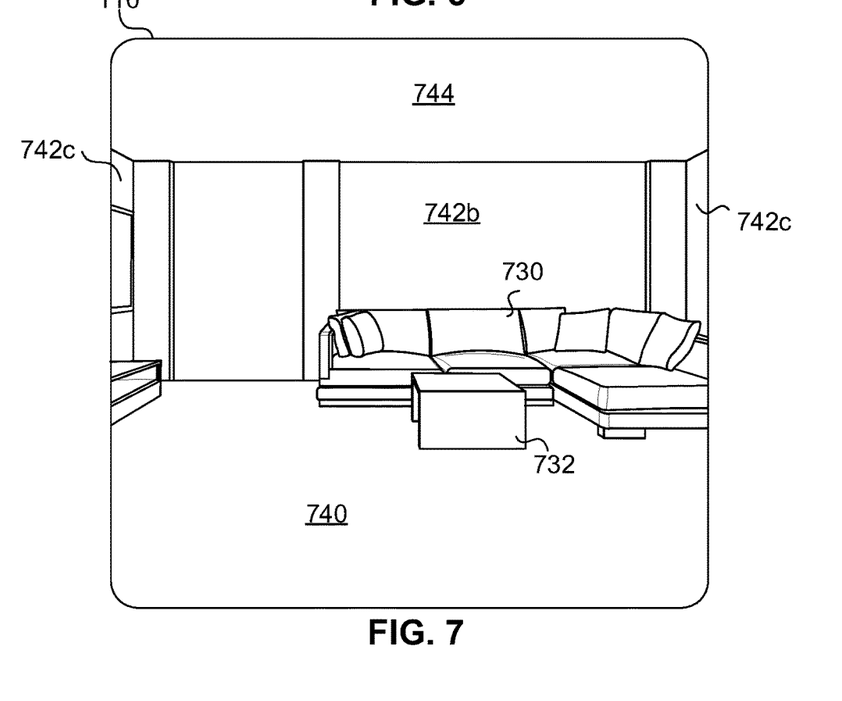
FIG. 7 illustrates a view provided by the device of FIG. 1 based on the physical environment in accordance with some implementations.

FIG. 7 illustrates a view provided by the device of FIG. 6 based on the physical environment 600. In this example, the view on device 110 provides a first viewing mode in which most (or all) of the view includes depictions of real objects of the physical environment, as opposed to virtual content. The view includes a depiction 740 of the floor 640, depictions 742a-c of the walls 642a-c, a depiction 744 of the ceiling 644, a depiction 730 of the sofa 630, and a depiction 732 of the table 632.

Figure 8:
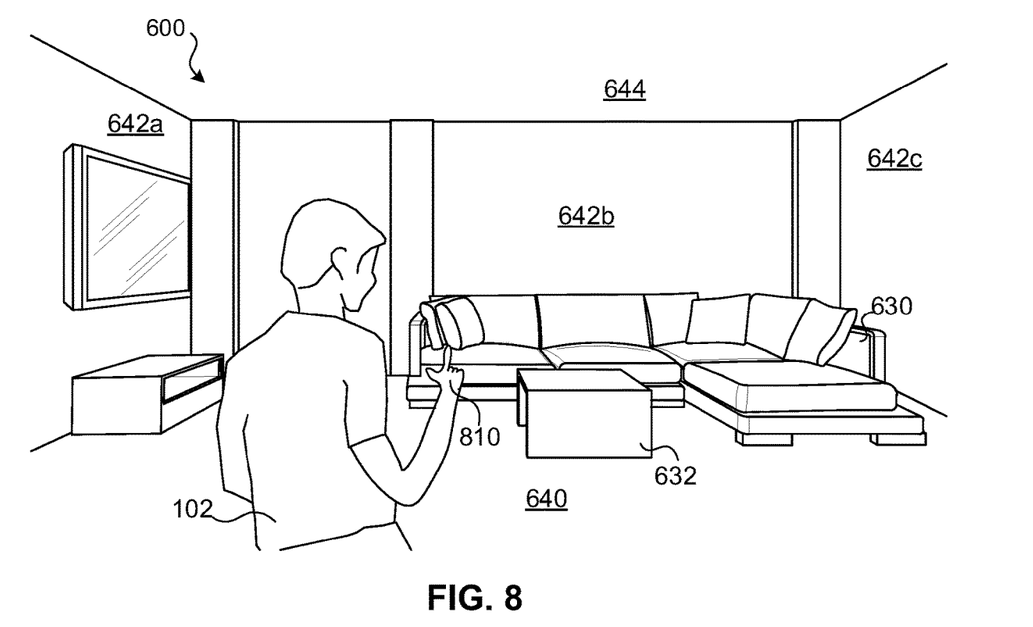
FIG. 8 illustrates user input selecting a persistent object of the physical environment of FIG. 6 in accordance with some implementations in accordance with some implementations.

FIG. 8 illustrates user input selecting a persistent object of the physical environment 600 of FIG. 6. In this example, the user provides input selecting the persistent object, e.g., the sofa 630, by pointing at the object. In other examples, other types of input, e.g., voice commands, touch commands on device 110, touching an object, or a combination of input types, are used to select one or more persistent objects of the physical environment 600. Pointing, gestures, touch input, and the like may be identified using cameras and/or other sensors on the electronic device 110.

Figure 9:
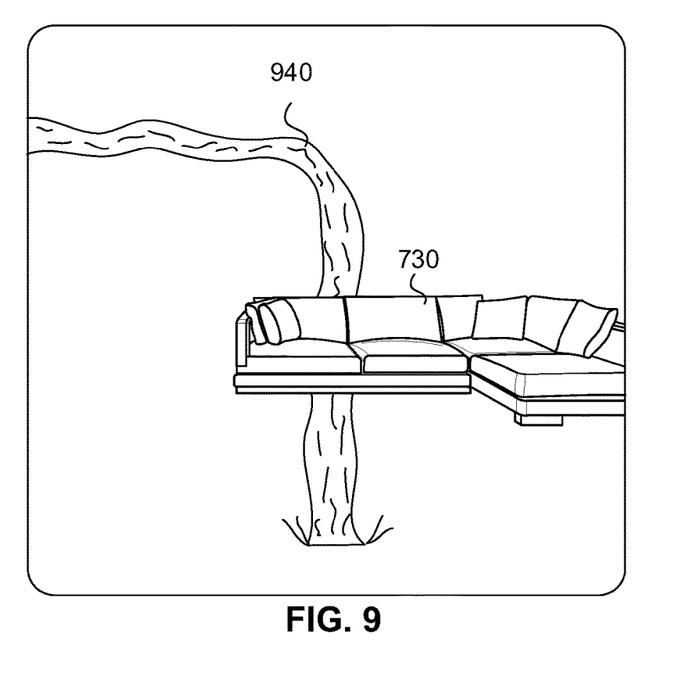
FIG. 9 illustrates a changed view of the XR environment provided by the device of FIGS. 6-8 in accordance with some implementations.

FIG. 9 illustrates a changed view of the XR environment provided by the device 110 of FIGS. 6-8 in accordance with some implementations. In this example, the device 110 switches to a second viewing mode in which some depictions of objects of the physical environment are removed or replaced with virtual content. Depictions of physical objects may be removed and replaced with virtual content that is more distance or that appears to go through a boundary previously provided by a depiction of an object of the physical environment. In the example of FIG. 9, the sofa 630 has been selected as a persistent object, while other objects (e.g., the floor 640, the walls 642a-c, the ceiling 644, and the table 632) are not selected as persistent objects. Accordingly, the view provided in FIG. 9 includes the depiction 730 of the sofa but does not include the depiction 740 of the floor 640, depictions 742a-c of the walls 642a-c, the depiction 744 of the ceiling 644, or the depiction 732 of the table 632. A user experiencing such a view may perceive an environment in which the user feels as if he or she is standing in mid-air, e.g., the floor as vanished. Virtual content, e.g., a virtual waterfall 940 flowing to a virtual floor (not shown) far below may be presented to further facilitate the appearance. However, the persistent object or objects are still shown, e.g., depiction 730 of the sofa 630 is still presented. The ongoing presentation of one or more selected persistent objects from the physical environment 600 may improve the user experience, for example, by ensuring that the user feels safe, grounded, and oriented with respect to at least some real aspects of the physical environment 600.

Figure 10:
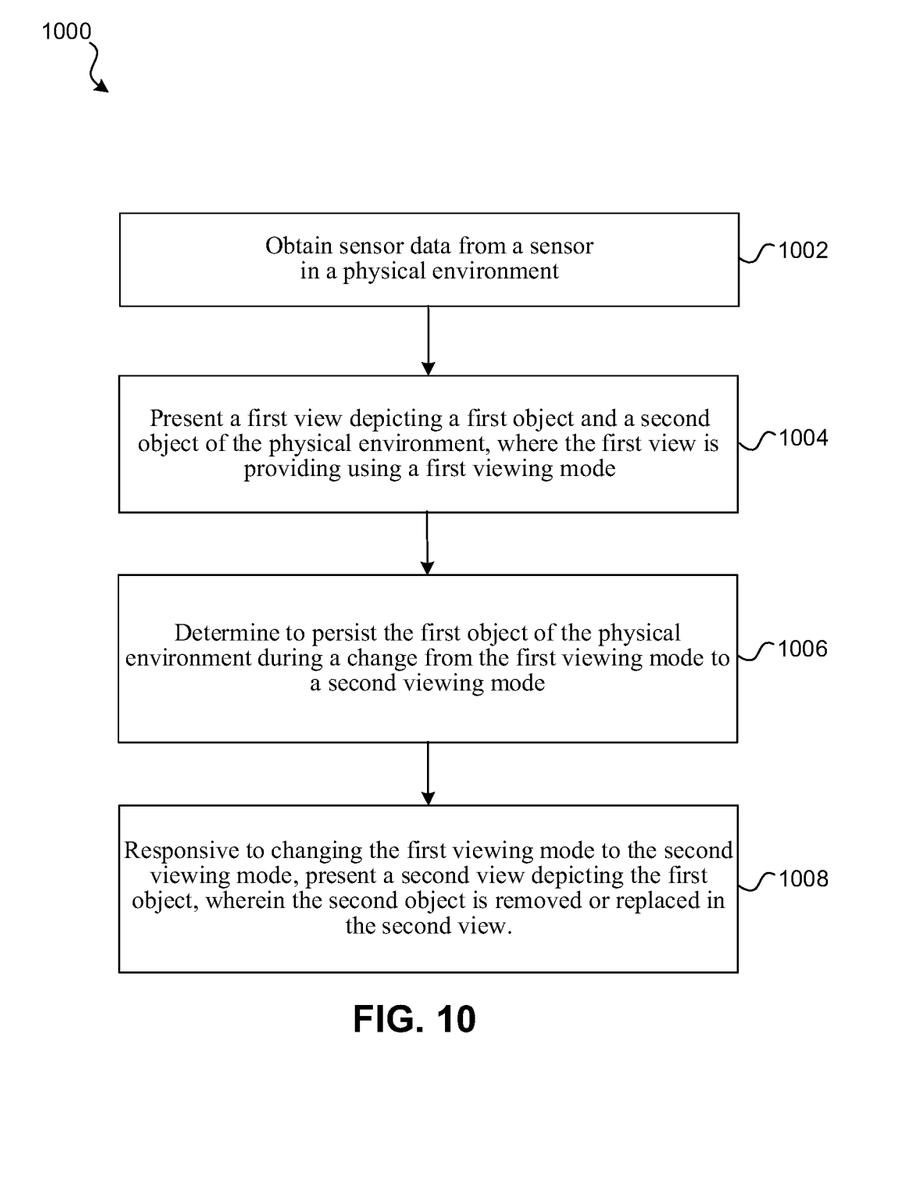
FIG. 10 is a flowchart illustrating a method for providing an XR environment that in which selected objects persist through a viewing mode transition in accordance with some implementations.

FIG. 10 is a flowchart illustrating a method 1000 for providing an XR environment that in which selected objects persist through a viewing mode transition in accordance with some implementations. In some implementations, a device such as electronic device 110 performs method 1000. In some implementations, method 1000 is performed on a mobile device, desktop, laptop, HMD, or server device. The method 1000 is performed by processing logic, including hardware, firmware, software, or a combination thereof. In some implementations, the method 1000 is performed on a processor executing code stored in a non-transitory computer-readable medium (e.g., a memory).

At block 1002, the method 1000 obtains sensor data from a sensor in a physical environment. For example, one or more images from one or more cameras on an electronic device may be captured. Sensor data may be obtained while a view of the physical environment is provided, e.g., via pass-through video.

At block 1004, the method 1000 presents a first view depicting a first object and a second object of the physical environment, where the first view is provided using a first viewing mode. For example, the first view may provide pass-through video of all (or most) of the real objects of the physical environment. In another example, the first view may include a view of all (or most) of the real objects of the physical environment through a transparent or translucent display.

At block 1006, the method 1000 identifies the first object of the physical environment to persist during a change from the first viewing mode to a second viewing mode, where the first object is identified based on received input. The first object may additionally be identified based on proximity (e.g., to the device or another object) and other criteria.

At block 1008, the method 1000, responsive to changing the first viewing mode to the second viewing mode, presents a second view depicting the first object, wherein the second object is removed or replaced in the second view. Objects that are not identified to persist in the second mode may appear to vanish or may be replaced with virtual content at the same position or a closer or more distant position. For example, the second object may be a floor and the second view may depict empty space in place of the floor. In some implementations, the first view provides pass through video of the physical environment and the second view provides an extended reality (XR) environment in which one or more depictions of objects of the physical environment are removed or replaced with virtual content. In other implementations, the first view provides a view of the physical environment through a transparent or translucent display and the second view provides an extended reality (XR) environment in which one or more depictions of objects of the physical environment are blocked or replaced with virtual content using the transparent or translucent display.

Figure 11:
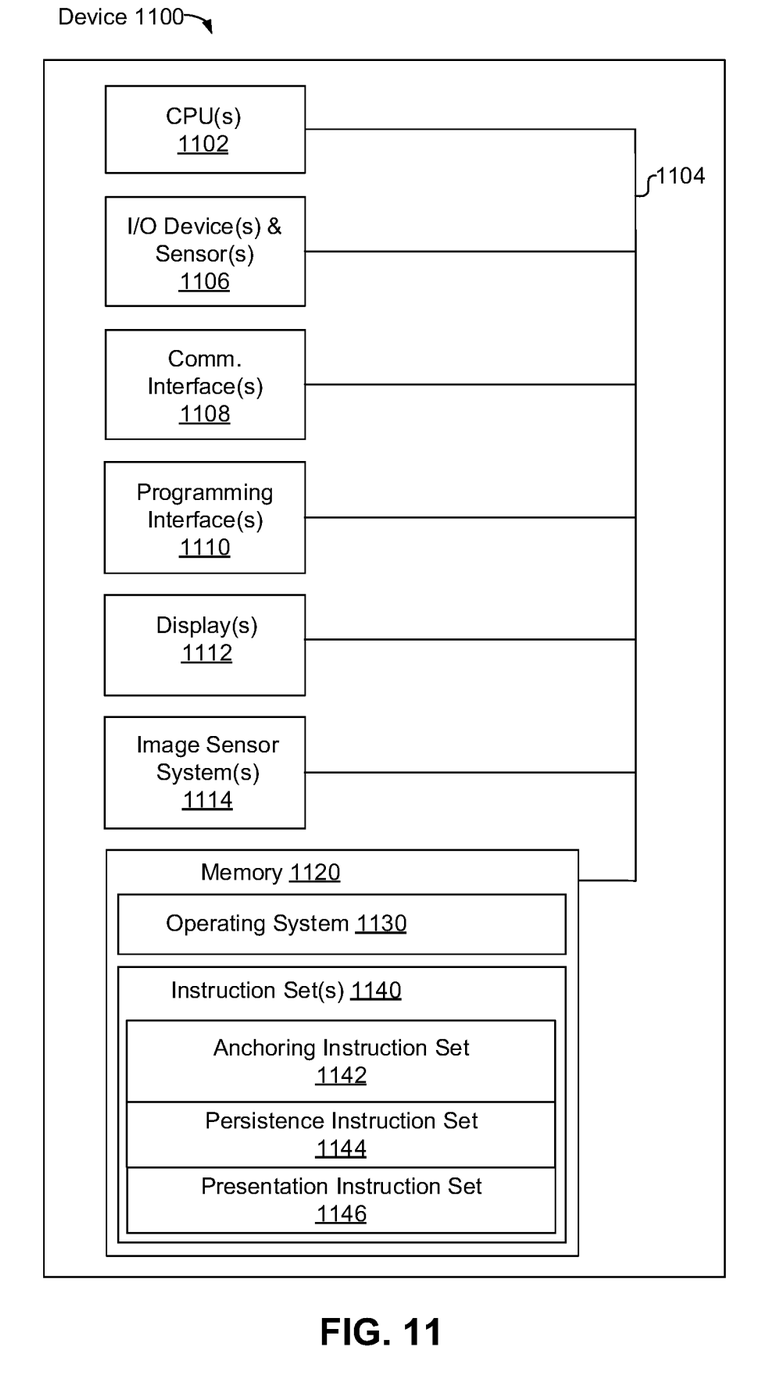
FIG. 11 is a block diagram of an electronic device of in accordance with some implementations.

FIG. 11 is a block diagram of electronic device 1100. Device 1100 illustrates an exemplary device configuration for electronic device 110. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1000 includes one or more processing units 1102 (e.g., microprocessors, ASICs, FPGAs, GPUs, CPUs, processing cores, and/or the like), one or more input/output (I/O) devices and sensors 1106, one or more communication interfaces 1108 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1110, one or more output device(s) 1112, one or more interior and/or exterior facing image sensor systems 1114, a memory 1120, and one or more communication buses 1104 for interconnecting these and various other components.

In some implementations, the one or more communication buses 1104 include circuitry that interconnects and controls communications between system components. In some implementations, the one or more I/O devices and sensors 1106 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1112 include one or more displays configured to present a view of a 3D environment to the user. In some implementations, the one or more displays 1112 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1100 includes a single display. In another example, the device 1100 includes a display for each eye of the user.

In some implementations, the one or more output device(s) 1112 include one or more audio producing devices. In some implementations, the one or more output device(s) 1112 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1112 may additionally or alternatively be configured to generate haptics.

In some implementations, the one or more image sensor systems 1114 are configured to obtain image data that corresponds to at least a portion of a physical environment. For example, the one or more image sensor systems 1114 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1114 further include illumination sources that emit light, such as a flash. In various implementations, the one or more image sensor systems 1114 further include an on-camera image signal processor (ISP) configured to execute a plurality of processing operations on the image data.

The memory 1120 includes high-speed random-access memory, such as DRAM, SRAM, DDR RAM, or other random-access solid-state memory devices. In some implementations, the memory 1120 includes non-volatile memory, such as one or more magnetic disk storage devices, optical disk storage devices, flash memory devices, or other non-volatile solid-state storage devices. The memory 1120 optionally includes one or more storage devices remotely located from the one or more processing units 1102. The memory 1120 comprises a non-transitory computer readable storage medium.

In some implementations, the memory 1120 or the non-transitory computer readable storage medium of the memory 1120 stores an optional operating system 1130 and one or more instruction set(s) 1140. The operating system 1130 includes procedures for handling various basic system services and for performing hardware dependent tasks. In some implementations, the instruction set(s) 1140 include executable software defined by binary information stored in the form of electrical charge. In some implementations, the instruction set(s) 1140 are software that is executable by the one or more processing units 1102 to carry out one or more of the techniques described herein.

The instruction set(s) 1140 include an anchoring instruction set 1142 configured to, upon execution, anchor and/or adapt virtual objects to objects in physical environments as described herein. The instruction set(s) 1140 further include a persistence instruction set 1144 configured to, upon execution, identify and/or persist objects of a physical environment in one or more viewing modes as described herein. The instruction set(s) 1140 further include a presentation instruction set 1144 configured to, upon execution, presents views of physical environments and XR environments as described herein. The instruction set(s) 1140 may be embodied as a single software executable or multiple software executables.

Although the instruction set(s) 1140 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a processor of a head-mounted device (HMD):
   obtaining sensor data from a sensor in a physical environment while the HMD is worn on a head of a user;
   determining a characteristic of a movable object of the physical environment based on the sensor data, wherein the movable object is separate from the user and the characteristic comprises a size or a boundary of the movable object;
   determining to anchor virtual content to the movable object, wherein, based on anchoring the virtual content to the movable object, the virtual content is moved based on movement of the movable object; and
   presenting an extended reality (XR) environment comprising a view of at least a portion of the physical environment from a viewpoint of the HMD within the physical environment, wherein, in the view, the virtual content replaces or enhances the movable object to which it is anchored and is adapted by being scaled, shaped, or positioned based on the size or the boundary of the movable object.

2. The method of claim 1, wherein the virtual content is adapted based on the characteristic of the movable object by adjusting a scale of the virtual content to correspond to a scale of the movable object.

3. The method of claim 1, wherein the virtual content is adapted based on the characteristic of the movable object by adjusting a shape of the virtual content to correspond to a shape of the movable object.

4. The method of claim 1, wherein the virtual content is adapted based on the characteristic of the movable object by positioning the virtual content such that an edge effect of the virtual content corresponds to an edge of the movable object.

5. The method of claim 1, further comprising, based on anchoring the virtual content to the movable object, interpreting movement of the movable object as input.

6. The method of claim 1, wherein anchoring the virtual content to the movable object comprises:
   detecting that the movable object comprises a horizontal surface satisfying a size criterion; and
   positioning the virtual content on or above the surface.

7. The method of claim 1, wherein determining to anchor the virtual content to the movable object is based on the characteristic of the movable object.

8. The method of claim 1, wherein determining to anchor the virtual content to the movable object is based on receiving input selecting the movable object.

9. A system comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the system to perform operations comprising:
   obtaining sensor data from a sensor in a physical environment while an HMD is worn on a head of a user;
   determining a characteristic of a movable object of the physical environment based on the sensor data, wherein the movable object is separate from the user and the characteristic comprises a size or a boundary of the movable object;

determining to anchor virtual content to the movable object, wherein, based on anchoring the virtual content to the movable object, the virtual content is moved based on movement of the movable object; and presenting an extended reality (XR) environment comprising a view of at least a portion of the physical environment from a viewpoint of the HMD within the physical environment, wherein, in the view, the virtual content replaces or enhances the movable object to which it is anchored and is adapted by being scaled, shaped, or positioned based on the size or the boundary of the movable object.

10. The system of claim 9, wherein the virtual content is adapted based on the characteristic of the movable object by adjusting a scale of the virtual content to correspond to a scale of the movable object.

11. The system of claim 9, wherein the virtual content is adapted based on the characteristic of the movable object by adjusting a shape of the virtual content to correspond to a shape of the movable object.

12. The system of claim 9, wherein the virtual content is adapted based on the characteristic of the movable object by positioning the virtual content such that an edge effect of the virtual content corresponds to an edge of the movable object.

13. The system of claim 9 further comprising, based on anchoring the virtual content to the movable object, interpreting movement of the movable object as input.

14. The system of claim 9, wherein anchoring the virtual content to the movable object comprises:

detecting that the movable object comprises a horizontal surface satisfying a size criterion; and positioning the virtual content on or above the surface.

15. The system of claim 9, wherein determining to anchor the virtual content to the movable object is based on the characteristic of the movable object.

16. The system of claim 9, wherein determining to anchor the virtual content to the movable object is based on receiving input selecting the movable object.

17. A non-transitory computer-readable storage medium storing program instructions executable via one or more processors to perform operations comprising:

obtaining sensor data from a sensor in a physical environment while an HMD is worn on a head of a user;

determining a characteristic of a movable object of the physical environment based on the sensor data, wherein the movable object is separate from the user and the characteristic comprises a size or a boundary of the movable object;

determining to anchor virtual content to the movable object, wherein, based on anchoring the virtual content to the movable object, the virtual content is moved based on movement of the movable object; and presenting an extended reality (XR) environment comprising a view of at least a portion of the physical environment from a viewpoint of the HMD within the physical environment, wherein, in the view, the virtual content replaces or enhances the movable object to which it is anchored and is adapted by being scaled, shaped, or positioned based on the size or the boundary of the movable object.

18. The non-transitory computer-readable storage medium of claim 17, wherein the virtual content is adapted based on the characteristic of the movable object by adjusting a scale of the virtual content to correspond to a scale of the movable object.

19. The non-transitory computer-readable storage medium of claim 17, wherein the virtual content is adapted based on the characteristic of the movable object by adjusting a shape of the virtual content to correspond to a shape of the movable object.

20. The non-transitory computer-readable storage medium of claim 17, wherein the virtual content is adapted based on the characteristic of the movable object by positioning the virtual content such that an edge effect of the virtual content corresponds to an edge of the movable object.

21. The non-transitory computer-readable storage medium of claim 17 further comprising, based on anchoring the virtual content to the movable object, interpreting movement of the movable object as input.

22. The non-transitory computer-readable storage medium of claim 17, wherein anchoring the virtual content to the movable object comprises:

detecting that the movable object comprises a horizontal surface satisfying a size criterion; and positioning the virtual content on or above the surface.

23. The non-transitory computer-readable storage medium of claim 17, wherein determining to anchor the virtual content to the movable object is based on the characteristic of the movable object.

24. The non-transitory computer-readable storage medium of claim 17, wherein determining to anchor the virtual content to the movable object is based on receiving input selecting the movable object.

* * * * *